United States Patent
Buschman et al.

(10) Patent No.: US 9,785,670 B2
(45) Date of Patent: *Oct. 10, 2017

(54) REVISING POLICY STATEMENTS USING HYPERLINKS

(71) Applicant: INTERNATIONAL BUSINESS MACHINES CORPORATION, Armonk, NY (US)

(72) Inventors: Steven Buschman, Concord, MA (US); Sean C. Foley, Chelmsford, MA (US); Minhui Yang, Littleton, MA (US)

(73) Assignee: International Business Machines Corporation, Armonk, NY (US)

( * ) Notice: Subject to any disclaimer, the term of this patent is extended or adjusted under 35 U.S.C. 154(b) by 32 days.

This patent is subject to a terminal disclaimer.

(21) Appl. No.: 14/634,980

(22) Filed: Mar. 2, 2015

(65) Prior Publication Data
US 2015/0339306 A1 Nov. 26, 2015

Related U.S. Application Data

(63) Continuation of application No. 14/283,615, filed on May 21, 2014.

(51) Int. Cl.
*G06F 17/30* (2006.01)
*G06F 21/62* (2013.01)
(Continued)

(52) U.S. Cl.
CPC .... *G06F 17/30398* (2013.01); *G06F 17/2235* (2013.01); *G06F 21/6218* (2013.01); *H04L 63/10* (2013.01); *H04L 63/20* (2013.01)

(58) Field of Classification Search
CPC .................................................. G06F 17/30398
(Continued)

(56) References Cited

U.S. PATENT DOCUMENTS 6,289,334 B1 9/2001 Reiner et al.
7,437,362 B1 10/2008 Ben-Natan
(Continued)

FOREIGN PATENT DOCUMENTS

EP 1653710 A1 5/2006
WO 2012150316 11/2012

OTHER PUBLICATIONS

List of IBM Patents or Patent Application Treated as Related—Apr. 16, 2015, pp. 1-2.
(Continued)

*Primary Examiner* — Joshua Bullock
(74) *Attorney, Agent, or Firm* — Law Office of Jim Boice

(57) ABSTRACT

A method, system, and/or computer program product revises a policy that provides rules on how to alter statements to access or manipulate data in a database. A user interface (UI) has a field containing a sample database query statement. The sample database query statement is parsed into clauses, where each clause depicts a specific type of grammatical structure. A different hyperlink is associated with each of the clauses. In response to receiving a signal activating a particular hyperlink for a particular clause, change options, for the particular clause, are presented from a resource that presents change options for the specific type of grammatical structure. User-selected changes to the particular clause are incorporated into a new rule, which causes a clause of the particular type of grammatical structure in any database query statement to be changed. Each change becomes a new rule in a revised policy.

14 Claims, 10 Drawing Sheets

(51) Int. Cl.
*G06F 17/22* (2006.01)
*H04L 29/06* (2006.01)
(58) Field of Classification Search
USPC .......................................................... 707/781
See application file for complete search history.

(56) References Cited

U.S. PATENT DOCUMENTS

| | | | | |
|---|---|---|---|---|
| 7,512,965 | B1* | 3/2009 | Amdur | H04L 63/20 726/1 |
| 8,214,877 | B1* | 7/2012 | Grimes | G06Q 10/087 707/694 |
| 8,892,530 | B1* | 11/2014 | Campbell | G06F 21/6227 707/694 |
| 2004/0088158 | A1* | 5/2004 | Sheu | G06F 17/3043 704/9 |
| 2006/0168255 | A1 | 7/2006 | Katz et al. | |
| 2007/0064702 | A1 | 3/2007 | Bates et al. | |
| 2007/0156793 | A1 | 7/2007 | D'Souza et al. | |
| 2011/0231889 | A1* | 9/2011 | Dheap | G06F 17/30389 726/1 |
| 2011/0313981 | A1 | 12/2011 | Ben-Natan | |
| 2013/0086470 | A1* | 4/2013 | Dorr | G06F 17/2735 715/256 |
| 2013/0110860 | A1* | 5/2013 | Taranov | G06F 17/30448 707/764 |
| 2013/0117313 | A1* | 5/2013 | Miao | G06F 21/6227 707/781 |
| 2014/0052749 | A1* | 2/2014 | Rissanen | G06F 21/6227 707/759 |

OTHER PUBLICATIONS

Ong et al., "Privacy Preserving Database Access Through Dynamic Privacy Filters With Stable Data Randomization", IEEE International Conference on Systems, Man and Cybernetics, 2007, pp. 1-6 (Abstract Only).
U.S. Appl. No. 12/817,482—Final Office Action Mailed Aug. 16, 2012.
U.S. Appl. No. 12/817,482—Non-Final Office Action Mailed Feb. 16, 2012.
B. Burridge, "Color Coder and Syntax Highligher for Transact SQL", brettb.com, Retrieved May 21, 2014, p. 1 of 1.
Microsoft, "Color Coding in Query Editors", microsoft.com, 2014, Retrieved May 21, 2014, p. 1 of 1.
Microsoft, "INF: SQL Query Analyzer Color Code Information", Article ID: 315689, microsoft.com, Last Revised Oct. 17, 2003, Retrieved May 21, 2014, p. 1 of 1.

* cited by examiner

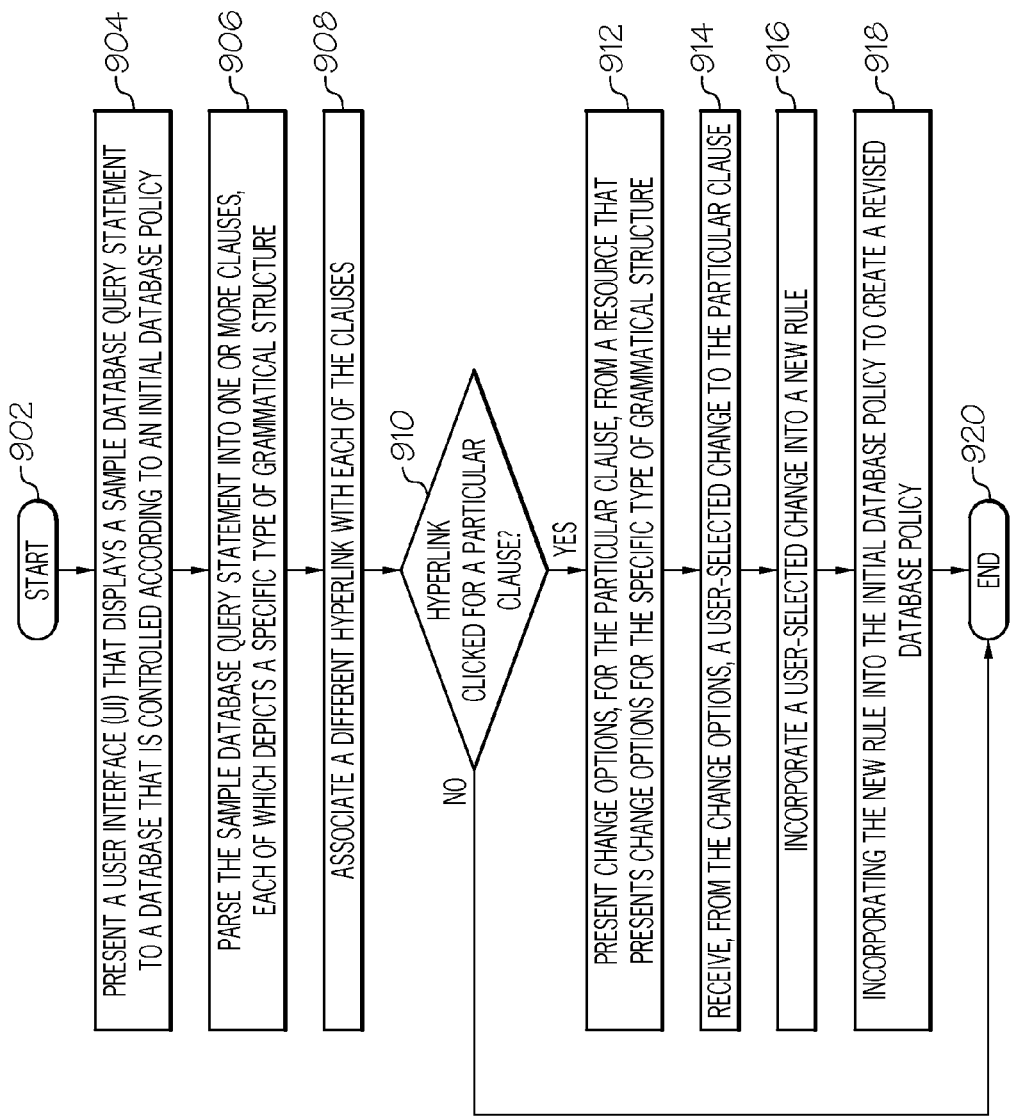

| FUNCTION | SQL REWRITE | ORIGINAL SQL | MODIFIED SQL |
|---|---|---|---|
| LIMIT WHAT ROWS ARE ACCESSIBLE | MODIFICATION OF "WHERE" CLAUSE | SELECT C FROM T | SELECT C FROM T WHERE... |
| LIMIT WHAT COLUMNS ARE ACCESSIBLE | MODIFICATION OF "SELECT" LIST | SELECT C1 FROM T | SELECT C2 FROM T |
| | | SELECT C1, C2 FROM T | SELECT C2 FROM T |
| LIMIT WHAT USERS CAN DO | MODIFICATION OF VERB | DROP TABLE T | UPDATE T SET ... |
| | MODIFICATION OF OBJECT | SELECT C FROM T1 | SELECT C FROM T2 |

FIG. 10

REVISING POLICY STATEMENTS USING HYPERLINKS

BACKGROUND

The present disclosure relates to the field of computers, and specifically to the use of computers in managing data. Still more particularly, the present disclosure relates to policy statements for controlling access to data in a database.

Data can be stored in databases, including relational databases. A relational database is typically created from tables of data. Each row/column in the table is assigned a key, which indicates a relationship between one row/column and another row/column (hence the name "relational database"). That is, a first key (called a "foreign key") for one row/column/table points to a second key (called a "primary key") of another row/column/table.

Management of data stored within a relational database is often performed using a Structured Query Language (SQL) statement. SQL is a special-purpose programming language designed for managing data contained in a relational database. SQL allows a user to modify data, make a request/query for data, delete data, and otherwise access to data within the relational database by executing SQL database query statements.

SUMMARY

A method, system, and/or computer program product that revises a policy that provides rules on how data in a database can be accessed or manipulated is presented. A user interface (UI) has a field containing a sample database query statement. The sample database query statement is parsed into one or more clauses, where each clause depicts a specific type of grammatical structure. A different hyperlink is associated with each of the clauses. In response to receiving a signal activating a particular hyperlink for a particular clause, change options, for the particular clause, are presented from a resource that presents change options for the specific type of grammatical structure. User-selected changes to the particular clause are incorporated into a new rule, which causes any clause of the particular type of grammatical structure in any other database query to be replaced with the user-entered change. The new rule is then incorporated into the policy to create a revised policy.

BRIEF DESCRIPTION OF THE DRAWINGS

Figure 4:
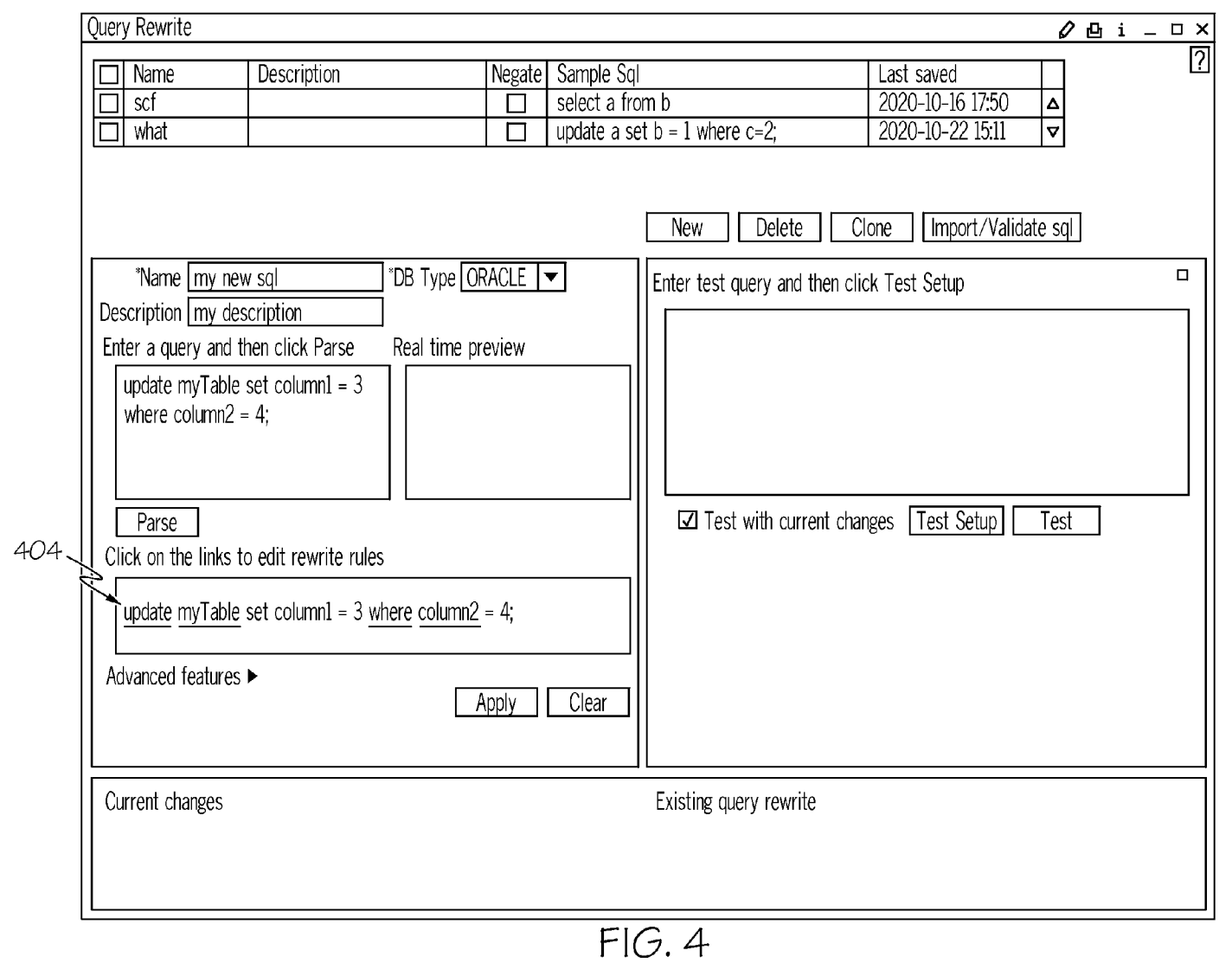

FIG. 4 illustrates the sample database query statement from FIG. 3 being parsed into different types of grammatical clauses;

FIG. 6 illustrates an object clause from the sample database query statement being changed by a user-selected change;

FIG. 7 depicts a subsequent database query statement being automatically modified in accordance with the user-selected change shown in FIG. 6;

Figure 8:
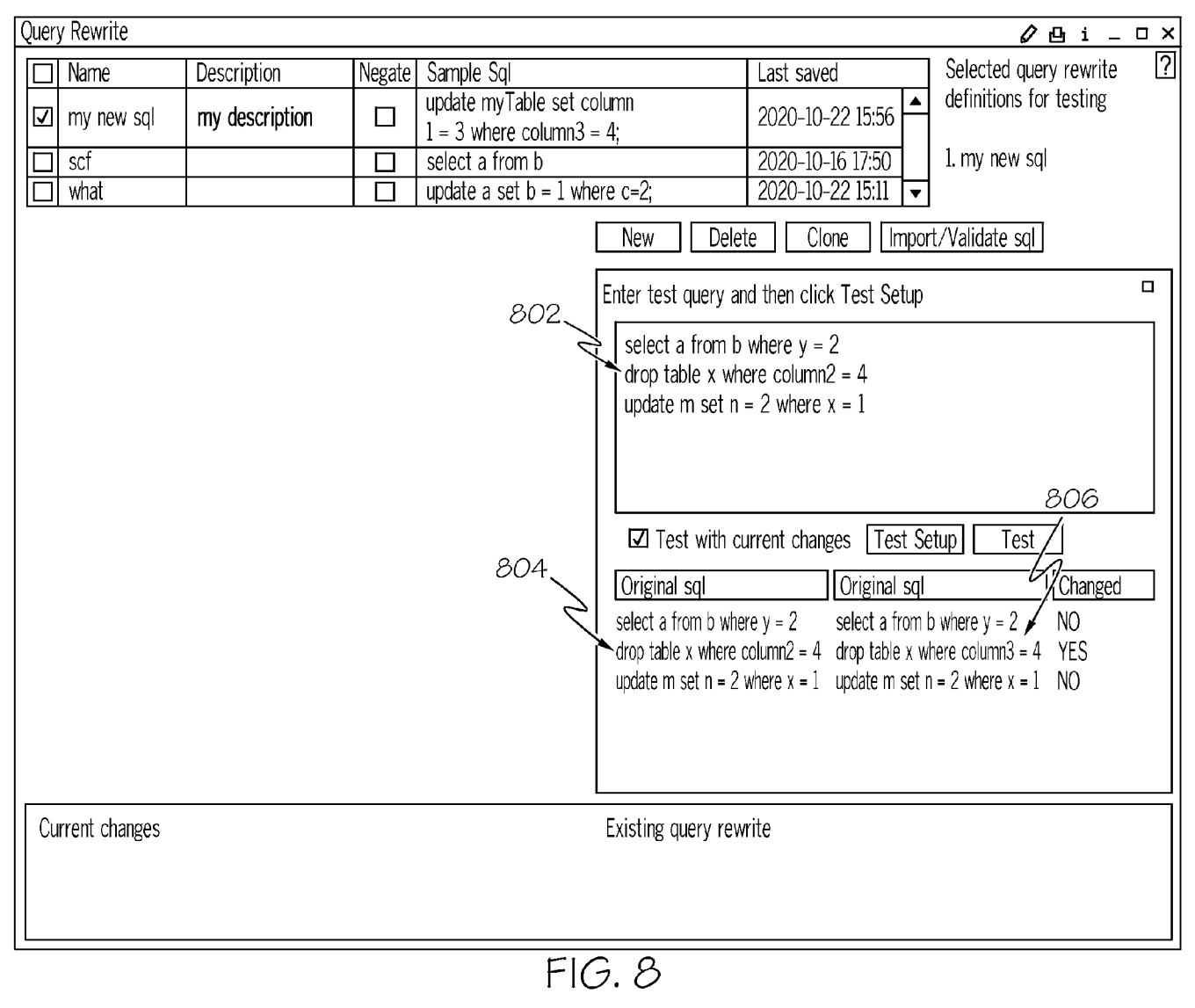

FIG. 8 illustrates multiple subsequent database query statements being selectively changed or left unchanged in accordance with the user-selected change shown in FIG. 6;

FIG. 9 is a high-level flowchart of one or more steps performed by one or more processors to dynamically manage policies for manipulating databases; and FIG. 10 presents an exemplary chart of exemplary Structured Query Language (SQL) functions that can be affected by the present invention.

DETAILED DESCRIPTION

Figure 1:
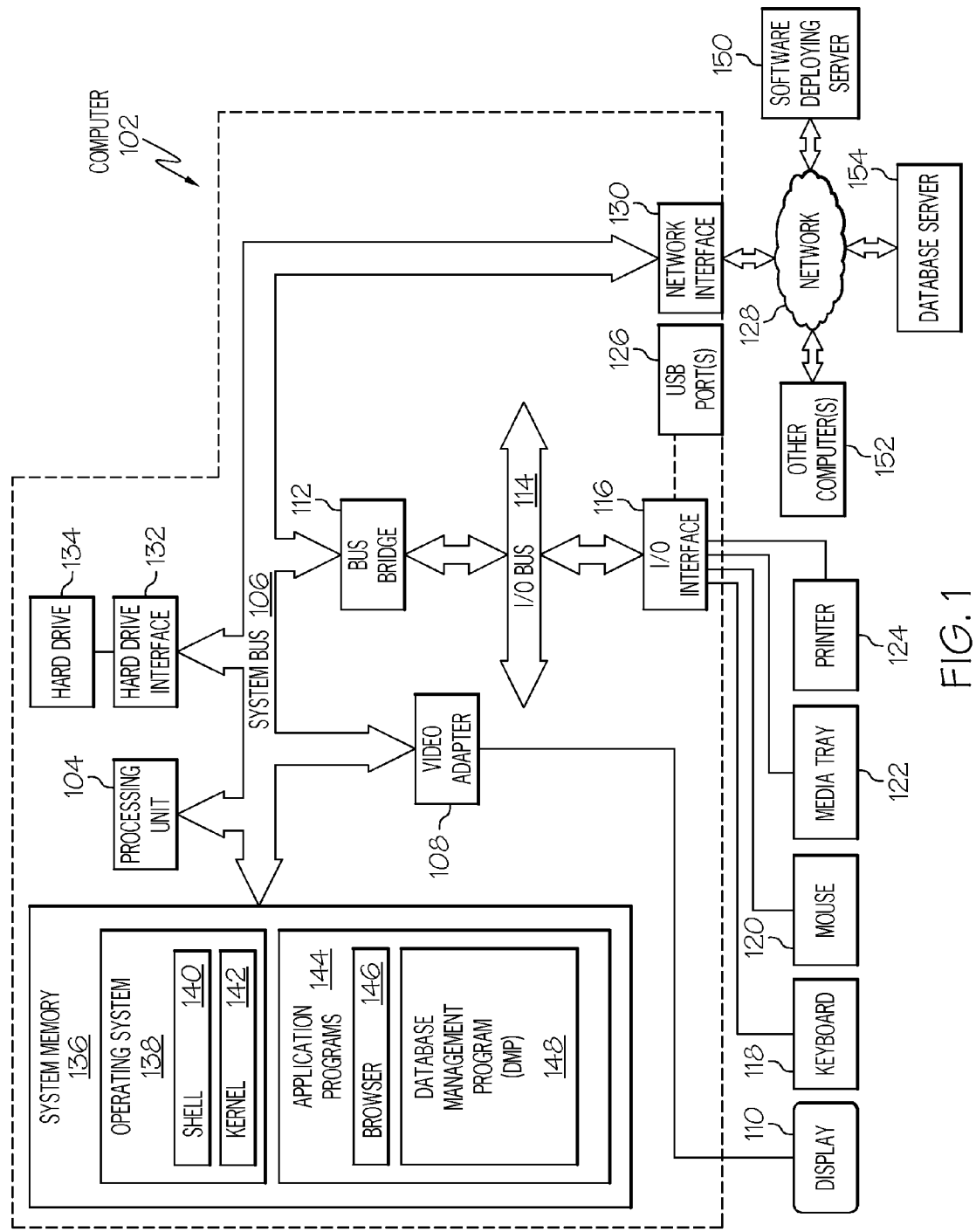
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or other computer(s) 152 and/or a database server 154.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a Database Management Program (DMP) 148. DMP 148 includes code for implementing the processes described below, including those described in FIGS. 2-10. In one embodiment, computer 102 is able to download DMP 148 from software deploying server 150, including in an on-demand basis, wherein the code in DMP 148 is not downloaded until needed for execution. Note further that, in one embodiment of the present invention, software deploying server 150 performs all of the functions associated with the present invention (including execution of DMP 148), thus freeing computer 102 from having to use its own internal computing resources to execute DMP 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
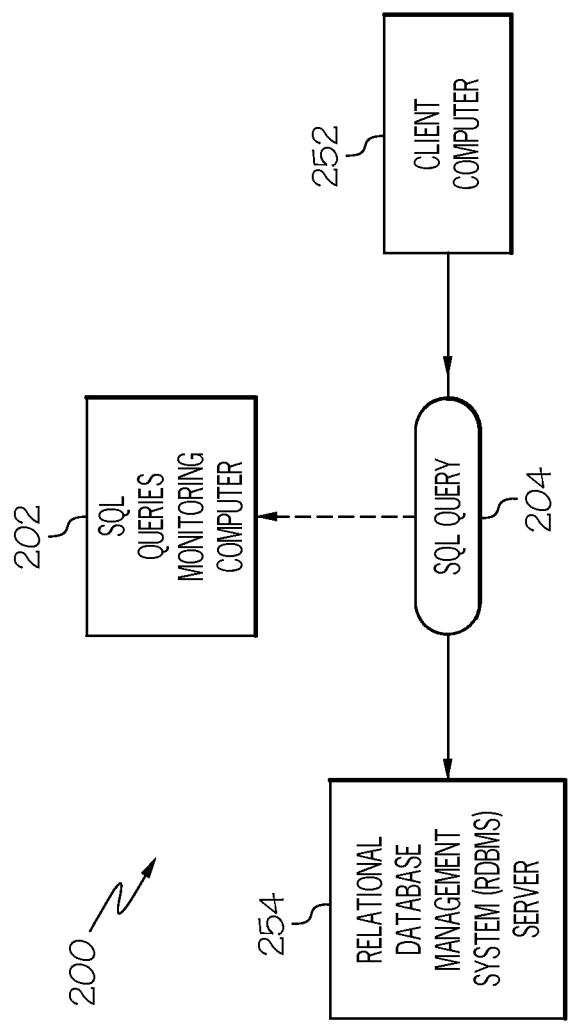
FIG. 2 illustrates an exemplary system in which Structured Query Language (SQL) queries to a Relational Database Management System (RDBMS) server are monitored and/or intercepted by an SQL queries monitoring computer.

With reference now to FIG. 2, an exemplary networked system 200 in which the present invention may be implemented is presented. Assume that a client desires to issue a query, statement or other expression (i.e., a request for data, a request to change the format of the data, a request to change/delete/add data, etc.) to a database. In one embodiment, the client is using a client computer 252 (analogous to other computer(s) 152 depicted in FIG. 1). Although the query or statement may be in any of various formats and the database may be of any of various structures, assume for exemplary purposes that it is Structured Query Language (SQL) (i.e., SQL query 204) and the database is a relational database. Assume further that this relational database is stored in a Relational Database Management System (RDBMS) server 254 (analogous to database server 154 shown in FIG. 1). Assume further that an SQL queries monitoring computer 202 (analogous to computer 102 in FIG. 1) is monitoring/intercepting SQL queries that are sent from the client computer (which may in some cases be the same computer) 252 to the RDBMS server 254.

In one embodiment, the interception/monitoring performed by SQL queries monitoring computer 202 is to ensure that the SQL query 204 is proper. This propriety of the query may be according to security issues, known client needs, etc. For example, assume that a user the client computer 252 wants to change the values in a certain column of data that is stored in the RDBMS server 254. A security rule may prohibit the user of client computer 252 from making such changes. As a result, in accordance with one embodiment of the present invention, the SQL queries monitoring computer 202 will alter, delete, or otherwise handle this improper SQL query 204.

Similarly, if logic within the SQL queries monitoring computer 202 knows what type of data is needed by the client computer 252, then the SQL queries monitoring computer 202 may alter the SQL query 204. For example, assume that the SQL query 204 is to retrieve a set of payroll data. However, the SQL queries monitoring computer 202 knows that the client computer 252 is used only for publishing a personnel directory for an enterprise. Therefore, the SQL query 204 is (mistakenly or nefariously) in error. The SQL queries monitoring computer 202 will therefore 1) adjust the SQL query 204 such that personnel names, but not their payroll information, is retrieved, or 2) simply deletes the SQL query 204 and returns an error message to the client computer 252.

Thus, SQL queries monitoring computer 202 acts as a gatekeeper for databases contained within the RDBMS server 254. Again, note that while RDBMS and SQL are used as exemplary database systems and language protocols, the present invention is also adaptable to be used in other database systems and/or other messaging protocols/languages.

Figure 3:
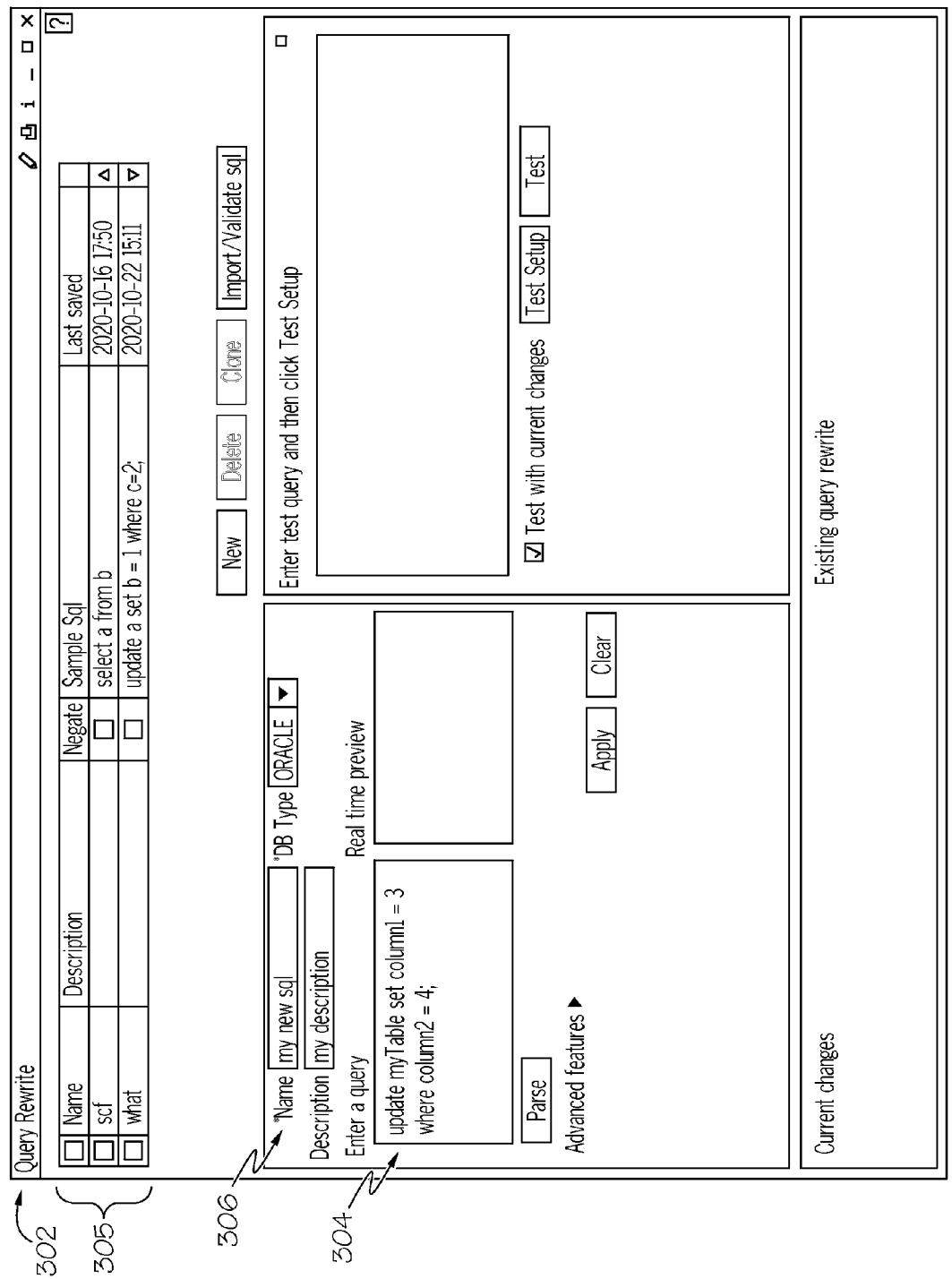
FIG. 3 depicts an exemplary Graphical User Interface (GUI) in which a sample database query statement is displayed.

With reference now to FIG. 3, consider exemplary Graphical User Interface (GUI) 302. In one embodiment, GUI 302 is presented on a display in a database monitoring system, such as the SQL queries monitoring computer 202 shown in FIG. 2. As shown in field 304, a user of SQL queries monitoring computer 202 enters a sample database query statement (i.e., a database query statement that is exemplary only, and thus is a "sample"). This sample database query statement can be previously created and stored (in one of the fields 305), or it can be created anew (i.e., the user can simply type in the SQL commands). As depicted, the sample database query statement is SQL statement "A":

update myTable set column1=3 where
        column2=4                (SQL statement "A")

SQL statement "A" directs an RDBMS to examine each row in a table called "myTable". If ("where") a cell in column2 of that table is populated with the value "4", then the cell in column 1 of the same row is instructed to populate ("set") that cell with the value "3". However, in one embodiment of the present invention the instructions themselves in SQL statement "A" are irrelevant. Rather, it is the grammatical types of instruction that matter. That is, each clause in SQL statement "A" is a particular type of grammatical structure. In SQL statement "A", these grammatical structures of the parsed clauses from SQL statement "A" are:

update—verb clause, which defines what the query is requesting
    myTable—object clause, which identifies the table (database)
    set—another verb clause
    column1=3; column 2=4—another set of object clauses, which identify columns that are to be acted upon
    where—conditional clause, which identifies a predicate condition FIG. 4 illustrates, in field 404, these different grammatical structures for SQL statement "A". Note that in one embodiment, different clauses are visually coded according to their grammatical type. As depicted, various clauses in field 404 are displayed and underlined as interactive hyperlinks. As described herein, this allows a user to modify a clause seamlessly in a graphical manner, without having any background knowledge of SQL grammar structure. The user can then click on a link to specify how he would like to change that element of the query.

Assume now that SQL statement "A" is a proper SQL statement that will cause an RDBMS to perform this action on the database "myTable". Assume further that the user wants to change one of the clauses for this particular SQL statement "A". Merely typing in a new command (e.g., changing "update" to "eliminate") may or may not be a proper SQL command (it is not). Therefore, without the present invention (as described below), the user would have to send a message to a subject matter expert in SQL, explain which command he/she wants to change, what he/she wants the new command to do, etc. The present invention overcomes this cumbersomeness through the user of hyperlinks to resources that 1) are specific for particular grammatical structures, and 2) can present and provide guidance for alternative clauses that are appropriate.

Figure 5:
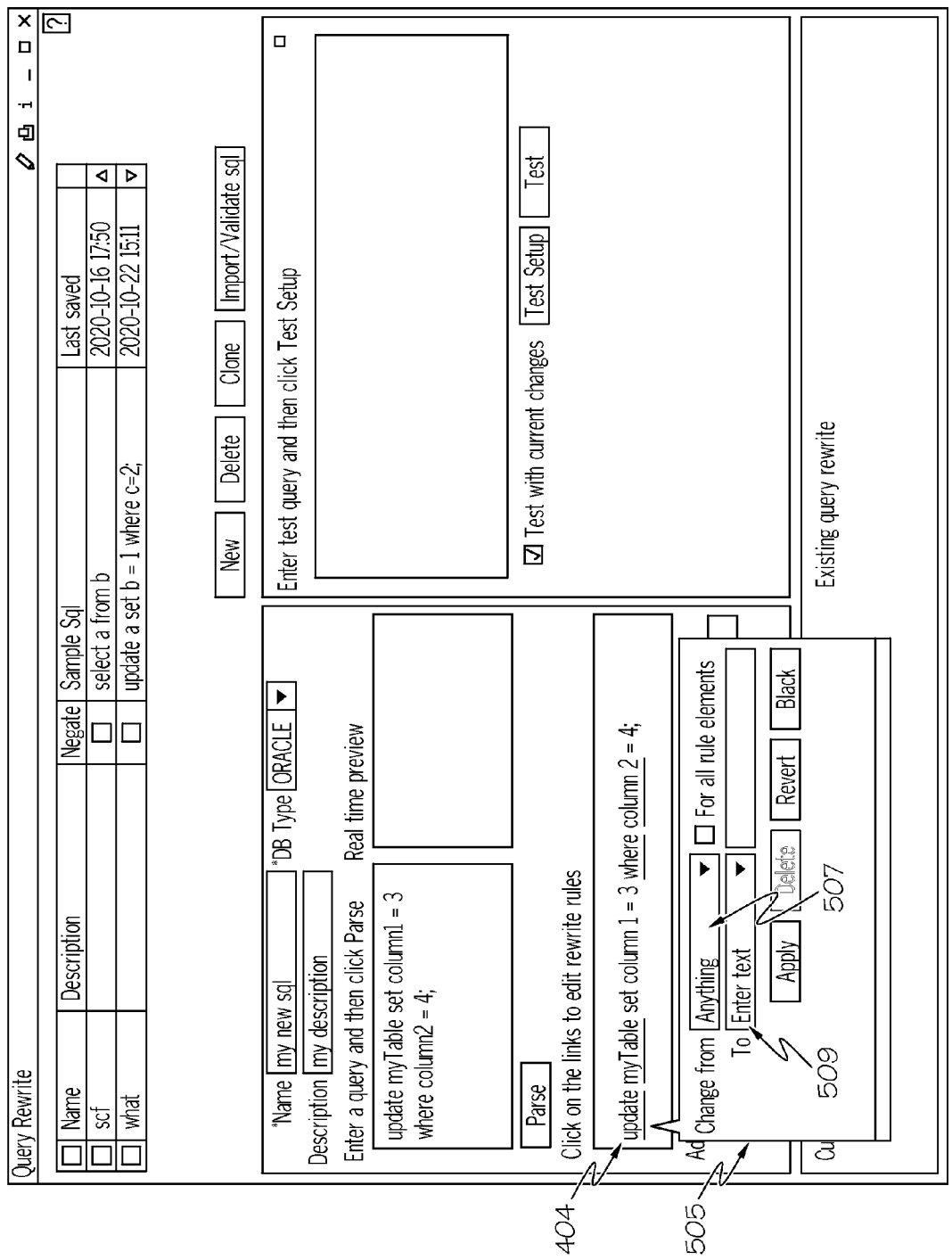
FIG. 5 depicts a verb clause from the sample database query statement being changed by a user-selected change.

Referring now to FIG. 5, assume that the user has clicked on the clause "update" in field 404. This results in the display of change option window 505, which allows the user to select a verb (including, but not limited to the verb "update") from field 507, and change it to a different verb from field 509. Note that field 507 and field 509 both have drop-down menus. Thus, the system knows 1) which verbs can be changed (according to security and other privileges held by a particular user), as well as 2) which new verbs can be used. That is, a particular user (based on his/her user profile) is only able to change verbs found in the drop-down menu in field 507, and can only change a selected verb from field 507 to a verb from the drop-down menu in field 509. For example, selecting "verb1" from field 507 results in the drop-down menu in field 509 being populated with only the verbs that this user is authorized to use when replacing "verb1". Selecting "verb2" from field 507 will result in the drop-down menu in field 509 being populated with only verbs that this user is authorized to use when replacing "verb2". These replacement verbs for "verb2" may be different from or the same as those used when replacing "verb1".

Figure 6:
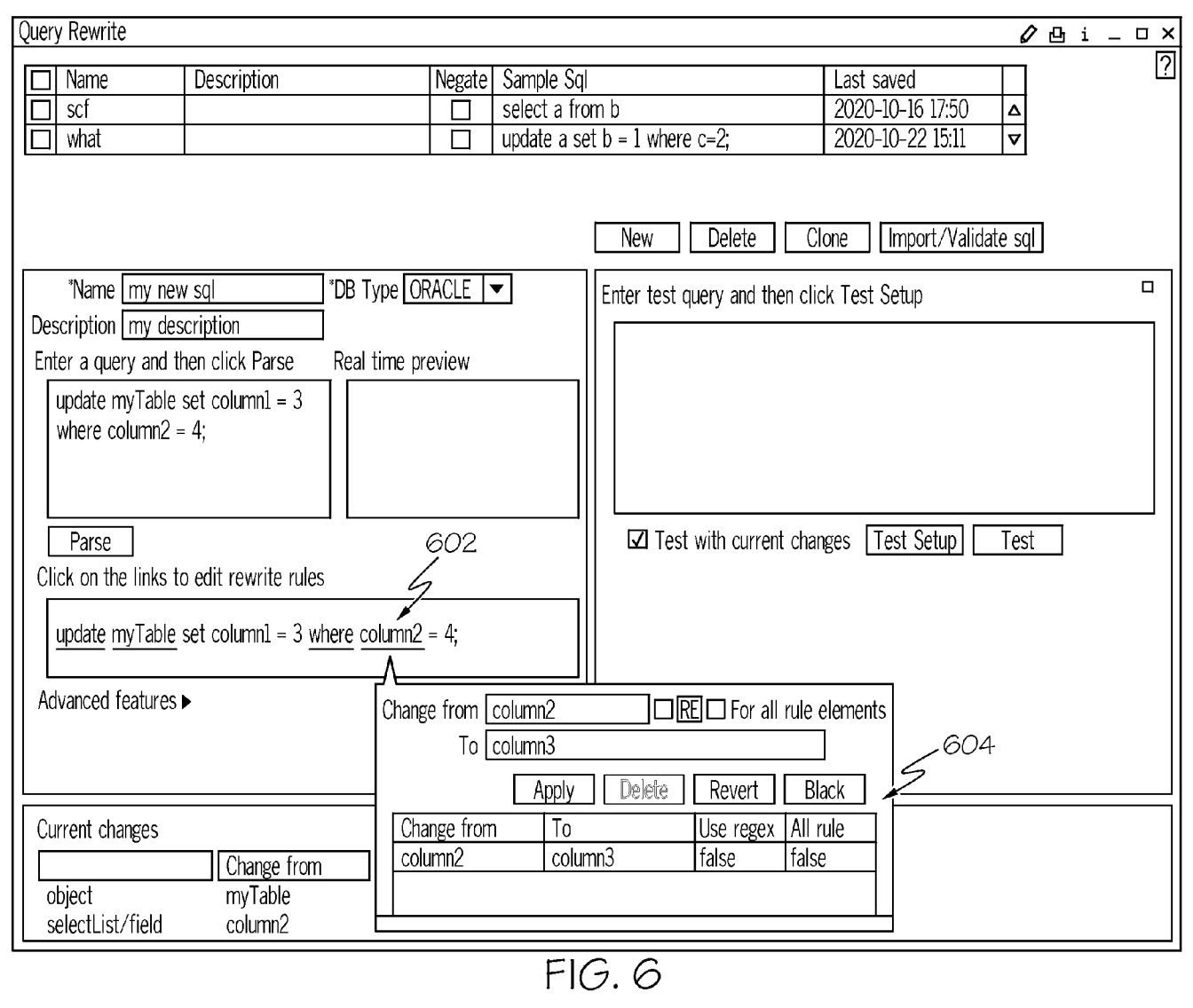

With reference now to FIG. 6, assume that a user chose to leave the verb ("update") in SQL statement "A" in its original form, but wants to change which row is the predicate condition for changing the values in column1. That is, rather than requiring that a cell in column2 have the value "4" to cause the cell in column1 (of the same row) to be populated with the value "3", the user wants to require a cell in column3 (not column2) to have the value "4" in order to cause the cell in column1 to be populated with the value "3".

In order to accomplish this, the user clicks hyperlink 602, which is embedded in the visually-coded and displayed clause "column2", thus causing the display of pop-up window 604. As shown, pop-up window 604 allows the user to change "column2" to "column3". Clicking the apply button stores the change to that particular type of grammatical structure as a rule. This rule is a rule that dictates that any similar grammatical element in any other SQL statement would be changed in the same way, by replacing any reference to column2 with a reference to column 3 instead. Applying this rule to the sample SQL would produce the statement:

update myTable set column1=3 where
        column3=4                    (SQL statement "A.1")

Additionally, the same rule can be applied to any other SQL statement that contains a predicate which refers to the same column column2, thus changing any such reference to column2 to a reference to column3, thus altering the meaning of the statement. Such a rule can be added to any number of other rules to create a policy. After clicking the hyperlinks and saving changes to the different grammatical clauses as a set of rules, the rules can be saved together as a policy.

Figure 7:
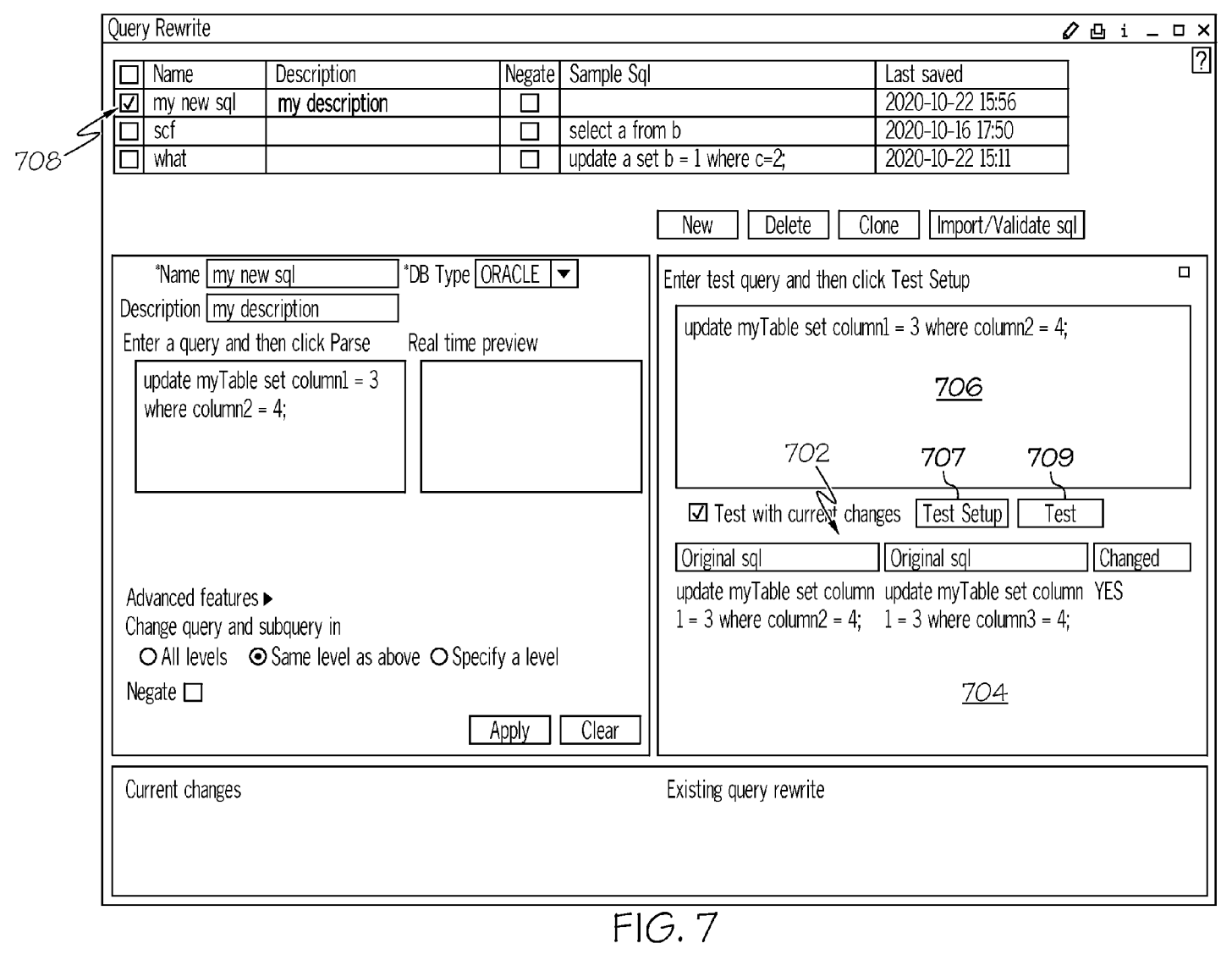

With reference now to FIG. 7, assume that the SQL queries monitoring computer 202 intercepts SQL statement "A". Applying the afore-mentioned rule to the intercepted statement would create a new statement (SQL statement A.1). In FIG. 7, the user has selected one or more policies from the list of saved policies shown in table 708. The user enters into box 706 any number of SQL queries. In FIG. 7, the user has entered the original sample SQL statement A. By clicking "Test Setup", changes to the test queries are applied according to the set of rules in the selected policies, and the altered query (SQL Statement "A.1") is displayed alongside the original query (SQL Statement "A") in table 704. Note that the user may populate box 706 with any number of potentially intercepted SQL statements. Furthermore, the user may select from table 708 any number of previously created policies. The user may then click "Test Setup" to evaluate the effects of the policies on the set of SQL statements, in order to verify that the policy acts upon the SQL statements as expected and that the altered statements satisfy the security constraints intended for the database server.

While the SQL statement "A" described above is a proper SQL statement (and would actually cause an action to occur in the database), the statement itself is not important in one embodiment of the present invention. Rather, in one embodiment of the present invention SQL statement "A" is merely a structure that allows a user to specify how structure A and other statements or queries should be changed. Each such change is a rule and a collection of rules is a policy. Such a policy and the rules within are intended to act upon any SQL query or statement, not just statement A. The policy may be applied to any statement at all. The user does not know, or need to know, all the statements to which the policy will be applied.

Thus, in the example shown above, the changes made to the SQL terms/clauses are only applied to SQL statement "A". However, in one embodiment of the present invention, the changes made are applied wherever the term/clause "column2" is used, regardless of what the SQL query actually states. For example, consider FIG. 8. As depicted in field 802 and field 804 in FIG. 8, an intercepted SQL statement is initially:

drop tablexwhere column2=4            (SQL statement "D")

This instruction (SQL statement "D") directs a database to delete any table that has the value "4" in any cell in column2. However, the change that was previously made to column2 (i.e., was made in SQL statement "A" as described above) is universal in this embodiment, such that any intercepted SQL statement with the clause "column2" will be automatically rewritten, such as in SQL statement "D.1" now shown in field 806:

drop tablexwhere column3=4 (SQL statement "D.1")

Therefore, the change to "column2" is made universally to any SQL statement/query that contains the clause "column2".

Thus, in FIG. 7, clicking the "Test Setup" button 707 results in testing any test query entered in field 706 to be tested against any rule/policy selected from the policies shown in table 708. Note further that field 706 may contain multiple SQL queries/statements, beyond the one shown in FIG. 7, which is actually the SQL query/statement that caused the new rule to be created.

When the rules/policies from table 708 are selected, and the SQL statements/queries are entered into field 706, then the user hits the "Test" button 709. This creates the new entry in field 704, showing how the test query has been changed by the selected rule(s) from table 708. That is, the system goes through each of the SQL queries/statements in the text area of field 706, applies the selected rules from table 708 to the SQL queries/statements in the field 706, thus creating the altered SQL query/statement shown in field 704, thus creating a revised table in the database. Thus, the field 704 allows the user to visually confirm that the rules and policies that the user created (shown in table 708) are functioning as expected.

While the figures above describe different embodiments for changing clauses in SQL statements (either specifically for a particular SQL statement—e.g., FIG. 7, or universally—e.g., FIG. 8), the predicate for making such changes varies according to various embodiments of the present invention.

For example, assume that SQL queries monitoring computer 202 is tasked with ensuring that security rules (which make up a security policy) are not violated when manipulating (i.e., requesting data, changing data, deleting data, changing data formats, etc.) information within a database. If the SQL queries monitoring computer 202 detects an illegal operation (e.g., a data manipulation for which the user of client computer 252 in FIG. 2 has no authorization), then the illegal clause is changed according to the clause change made by the operator of the SQL queries monitoring computer 202 (e.g., see FIG. 6). That is if "drop table×where column2=4" (SQL statement "D") is an illegal query, since the user is unauthorized to manipulate data based on the contents of column2, then the system automatically translates illegal/unauthorized SQL statement "D" into the legal/authorized SQL statement "D.1" ("drop table×where column3=4"), assuming that the user is authorized to manipulate data based on the contents of column3.

In another example, if the user of client computer 252 is requesting data for which he has no legitimate use (e.g., this user has accidentally requested the data), then the monitoring computer 202 will automatically correct the SQL statement to request data that the user actually needed (e.g., data from column3 instead of column2 in a database of records).

A policy is made up of one or more rules. Each of the rules describes what actions must be performed on an SQL statement so that the statement does not violate the security constraints on the database.

With reference now to FIG. 9, a high-level flowchart of one or more steps performed by one or more processors to dynamically manage policies for database access is presented. That is, a method is presented for revising an initial policy, where the initial policy includes rules dictating changes to database access and manipulation statements, thereby limiting how a database can be accessed or manipulated.

After initiator block 902, a user interface (UI) is generated and presented on a display on a computer (block 904). This UI, which in one embodiment is a graphical user interface (GUI), includes a field that contains (i.e., shows/displays) a sample database query statement. In one embodiment, the sample database query statement may be a reusable (i.e., legitimate) SQL statement/command that actually performs some action within the database system, or it may simply be a series of SQL clauses/terms/commands that, when combined, are meaningless to the database system. In either embodiment, the sample (e.g., exemplary) SQL statement has multiple different types of grammatical terms (according to the SQL protocol).

As described in block 906, the sample database query statement is then parsed into one or more clauses, where each clause depicts a specific type of grammatical structure.

As described in block 908, a different hyperlink is then associated with each of the clauses from the parsed sample database query statement.

As described in query block 910, a query is made as to whether a user has clicked any of the hyperlinks that are associated with the clauses. If so (block 912), then the user is presented with change options for the particular clause to which the hyperlinks is associated. As shown in one or more of the figures herein, the hyperlink takes the user to a resource (e.g., a HyperText Markup Language (HTML) document) that presents change options for the specific type of grammatical structure. That is, in one embodiment each hyperlink is specific for a particular type of grammatical structure, such that a hyperlink associated with a particular SQL clause (e.g., "change") only presents change options according to 1) what type of clause describes the initial SQL clause; 2) the functionality of the initial SQL clause itself; and/or 3) what changes a particular user is authorized to perform in the SQL document Regarding feature 1) ("what type of clause describes the initial SQL clause"), only replacement clauses of the same grammatical type (i.e., subject, verb, condition, etc.) as the initial SQL clause are presented as change options.

Regarding feature 2) ("the functionality of the initial SQL clause itself"), only clauses that perform the same function (e.g., retrieve data, change data, delete data, etc.) are presented as change options.

Regarding feature 3) ("what changes a particular user is authorized to perform in the SQL document"), only changes for which the user is authorized to make (e.g., delete a table, access a particular column, etc.) are presented as change options.

Returning to FIG. 9, once the user has selected one or more changes to the SQL statement (block 914), each change is incorporated as a new rule for the system, and the collection of rules forms a policy. For example, assume that the user-selected change (e.g., from the drop-down menu) causes values in column1 to be predicated upon a value in column3 instead of column2. This creates a rule which dictates that for any SQL statement for which column1 is predicated upon column2, the statement is changed so that column1 is predicated upon column3 instead. Applying the sequence of all rules in the policy to any given SQL statement results in a new SQL statement being dictated by that policy.

With reference now to block 916, subsequently received/monitored SQL statements are then changed accordingly, by replacing "column2" with "column3" in these new SQL statements, in accordance with the new resulting rule.

In one embodiment, it is not merely "column2" that is replaced with "column3" in the new SQL statements, but rather any clause of the particular type of grammatical structure that is followed by the clause "column2" (i.e., any "object" clause) will be replaced with the user-entered change. That is, in one embodiment any object clause (e.g., "column2", "table4", "cellA3", etc.) will be replaced with the object clause "column3" according to the new rule. This change is achieved not by matching terms (i.e., "column1" as described above), but by matching the grammatical types of the clause (i.e., object, verb, condition, etc.).

As described in block 918, the new rule is then incorporated into the initial policy to create a revised policy. Thereafter, the revised policy controls how subsequent SQL statements accessing a database are handled/changed. The flowchart ends at terminator block 920.

In one embodiment of the present invention, the revised policy identifies security requirements for a particular database, including, but not limited to, how to access and otherwise manipulate a database, what actions can be performed on the database, etc.

In one embodiment of the present invention, the revised policy is installed in a database server (e.g., RDBMS server 254 shown in FIG. 2) that manages the particular database, such that that database is appropriates controlled, access restricted, etc.

In one embodiment of the present invention, the syntax that is supported by the database server is identified. For example, one database may support SQL, while another may support, DB2, while another may support HTML, etc. Based on which syntax is supported by the database, the parsing of the sample database query statement uses the syntax that is supported by the database server.

In one embodiment of the present invention, the database server is required to follow the policy. That is, the newly revised policy is assigned to a particular database server, which is bound to follow the rules in the policy. Thus, in this embodiment, the revised policy is applied to generalized SQL statements, where the generalized SQL statements are designed to retrieve data from a database that is not found in the database server that is required to follow the revised policy statement. That is, assume that SQL queries monitoring computer 202 identifies an SQL query that is not directed to RDBMS server 254. Nonetheless, the newly revised policy is portable, such that it is applied to databases in any other database server. Thus, policies that are generated for the user of one database server can be applied to other database servers.

In one embodiment of the present invention, each clause in the sample database query statement contains multiple nested sub-statements. That is, an SQL query may contain different levels of instructions (i.e., sub-statements that are "nested" within one another). In this embodiment, the user makes a decision as to which level of the nesting the rule will be applied. Based on this user-selection, the system then applies the new policy rule only to instructions down to a particular nesting level.

The invention disclosed herein allows the user to interactively create a rewrite policy without detailed knowledge of SQL grammar, without detailed knowledge of what rewrite policies are possible, and without any expertise about the security system itself. The user simply supplies the changes as he sees fit upon the options provided by the GUI (e.g., as shown in FIG. 5 and FIG. 6), using only Graphical elements such as text boxes and hyperlinks, applied to an SQL expression. Once the user is satisfied, he can save the SQL statement (and its resulting policy) for further use, either testing it, or installing it.

The process by which the rules are created by use of a sample SQL creates new rules from scratch, starting with the provision of a sample SQL and proceeding from there.

In another embodiment, the invention allows for the same process but applied to previously saved rules, so that the user does not need to start from the beginning In this embodiment, the user loads a previously saved policy and within it all previously saved rules, along with the sample SQL that was used to create the rules. All the elements of the previously saved policy are loaded. The previously used sample SQL is entered into the GUI controls, the SQL is parsed, and the hyperlinks are presented to the user. When the user clicks the hyperlinks to see the controls for each clause of the SQL expression, these controls are already populated with the changes dictated by the rules that were saved previously into the previous policy. For example, if the previously saved rule dictated that all references to column1 are changed to column2, then the controls are prepopulated with those changes, showing that column1 is to be mapped to column2. This allows the user to make a new revised rule and a revised policy containing that rule, starting from a previously saved policy and its previously saved rules.

In another embodiment, the user can create a duplicate copy, a clone, of a previously saved policy, so that he makes changes to one of the two policies, and save those changes. In the end the user has two policies, the original and the altered policy, and has been able to create the second policy by making changes to the first, rather than creating a new policy by starting from nothing at all.

By incorporating the features described herein into a database system, dynamic changes can be made to SQL queries/statements issued to a database. For example, consider FIG. 10, in which a chart 1000 illustrates various functions that can be modified/managed using the presently disclosed invention. Chart 1000 provides examples of how rewrite policies provide for database security in one or more embodiments of the present invention.

For example, if a user wishes to limit the data accessible from queries to the database, that user has options to limit both the rows that are selected as well as the columns appearing in each selected row. If the user wishes to limit the rows accessible in a table in the database, then the user can modify the "where" clause of all SQLs. In the example shown in FIG. 10, the SQL statement "Select C from T" is added to a "where" clause, thus limiting the rows that are accessed by the original SQL by adding an additional where clause (i.e., thus taking on additional conditions that will restrict the number of rows that are returned by the query).

If the user wishes to limit the columns accessible in a table, the user can modify the SQL select list in all select queries. In the example shown, rather than allowing a query to see columns (C1), all queries will be changed to see column2 (C2) instead of column1 (C1). Furthermore, if the user wishes to limit what actions can be taken to modify the database, the user can modify the verb. For example, the user can change a "drop" (i.e., "delete") command, in order to delete certain rows in a table, rather than the entire table being deleted.

Furthermore, the user can modify what object is targeted. Instead of allowing users to query the data from one table, the user can redirect all such queries so that the user sees the data from some other table that is similar to, but not the same as, the first table.

Thus, table 1000 depicts fine-grained access control over what data is accessible and what actions can be taken on a database, thus providing for database security.

Note that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method for revising an initial policy, wherein the initial policy includes rules for how statements to access or manipulate data in a database are to be altered, and wherein the method comprises:
   providing, by one or more processors, a user interface (UI) to a computer, wherein the UI comprises a field containing a sample database statement, wherein the sample database statement performs an action on the data in the database;
   parsing, by one or more processors, the sample database statement into one or more clauses, wherein each clause depicts a specific type of grammatical structure, and wherein the grammatical structure is from a group consisting of a verb, an object, and a condition;
   associating, by one or more processors, a different hyperlink to each of the clauses, wherein each different hyperlink is specific for a particular type of grammatical structure;
   in response to receiving a signal activating a particular hyperlink for a particular clause in the sample database statement, presenting, by one or more processors, change options, for the particular clause, from a resource that presents change options for the specific type of grammatical structure;
   receiving, from the change options, a user-selected change, wherein the user-selected change is applicable to a matching clause in another database statement;
   incorporating, by one or more processors, each user-selected change into a new rule, wherein the new rule causes a clause, of the particular type of grammatical structure, in the sample database statement to be changed according to a change option that was selected;
   incorporating the new rule into the initial policy to create a revised policy; and
   modifying the sample database statement according to the revised policy.

2. The method of claim 1, wherein the revised policy identifies security requirements for a particular database.

3. The method of claim 2, further comprising:
   installing, by one or more processors, the revised policy in a database server that manages the particular database.

4. The method of claim 3, further comprising:
   identifying, by one or more processors, a syntax that is supported by the database server; and
   performing, by one or more processors, said parsing of the sample database query statement using the syntax that is supported by the database server.

5. The method of claim 3, wherein the database server is required to apply the revised policy to any statement issued to access a database in said database server.

6. The method of claim 1, further comprising:
   receiving, by one or more processors, a test statement, wherein the test statement is an instruction to access or manipulate a database that is governed by the revised policy; and
   in response to receiving the test statement, one or more processors presenting to the user a result of applying rules in the revised policy to said test statement.

7. The method of claim 6, wherein the test statement comprises multiple terms, and wherein the method further comprises:
   in response to receiving the test statement, presenting to a user a result of applying the revised policy to the all the terms in the given test query or statement.

8. The method of claim 1, wherein the initial policy is selected from a group consisting of expressions, language, and structured query language (SQL).

9. The method of claim 1, wherein each clause in the sample database query statement comprises multiple nested sub-statements, and wherein the method further comprises:
   receiving, by one or more processors and from the user, directions regarding which of the nested sub-statements are to have the user-entered change applied thereto.

10. The method of claim 1, wherein the sample database statement is from a group of executable statements consisting of a request for data from the database, a request to change a format of data in the database, and a request to alter data in the database.

11. The method of claim 1, wherein the sample database statement is a structured query language (SQL) query for data from the database, and wherein the method further comprises:
   detecting, by an SQL queries monitoring computer, that the SQL query is unauthorized;
   in response to detecting that the SQL query is unauthorized, altering, by the SQL queries monitoring computer, the SQL query by applying the revised policy to the SQL query to create an altered SQL query; and
   transmitting, by the SQL queries monitoring computer, the altered SQL query to the database.

12. The method of claim 1, wherein the sample database statement is retrieved from a database of previously created and stored database statements.

13. The method of claim 1, further comprising:
   visually coding, by one or more processors, each of the one or more clauses according to the specific type of grammatical structure that is associated with the one or more clauses to create visually coded clauses; and
   displaying, on the UI to the computer, the visually coded clauses.

14. The method of claim 1, further comprising:
   identifying, by one or more processors, multiple database statements that include the one or more clauses that were changed in the sample database statement according to the revised policy, wherein the multiple database statements are different from the sample database statement; and
   altering, by one or more processors, the multiple database statements by changing the one or more clauses therein according to the revised policy.

* * * * *